United States Patent [19]
Marcus et al.

[11] Patent Number: 5,100,355
[45] Date of Patent: Mar. 31, 1992

[54] MICROMINIATURE TAPERED ALL-METAL STRUCTURES

[75] Inventors: Robert B. Marcus, Murray Hill; Tirunelveli S. Ravi, Eatontown, both of N.J.

[73] Assignee: Bell Communications Research, Inc., Livingston, N.J.

[21] Appl. No.: 722,695

[22] Filed: Jun. 28, 1991

[51] Int. Cl.$^5$ .............................................. H01J 1/02
[52] U.S. Cl. ...................................... 445/24; 156/628; 156/647; 156/662; 445/50; 164/45; 164/46; 164/131
[58] Field of Search ....................... 313/309, 336, 351; 445/24, 50; 156/647, 662, 628; 437/245; 164/45, 131, 46

[56] References Cited

U.S. PATENT DOCUMENTS

| | | | |
|---|---|---|---|
| 2,817,002 | 12/1957 | Dyke et al. | 219/121 |
| 3,921,022 | 11/1975 | Levine | 313/309 |
| 3,970,887 | 7/1976 | Smith et al. | 313/336 X |
| 4,141,405 | 2/1979 | Spindt | 164/46 |
| 4,307,507 | 12/1981 | Gray et al. | 29/580 |
| 4,685,996 | 8/1987 | Busta et al. | 156/628 |
| 4,721,885 | 1/1988 | Brodie | 313/576 |
| 4,916,002 | 4/1990 | Carver | 437/245 X |

OTHER PUBLICATIONS

Sprindt et al., "Physical properties of thin-film emission cathodes with molybdenum cones", Journal of Applied Physics, vol. 47, No. 12, Dec. 1976, pp.5248-5263.

*Primary Examiner*—Kenneth J. Ramsey
*Attorney, Agent, or Firm*—Leonard Charles Suchyta; James W. Falk

[57] ABSTRACT

In a structure comprising an ultra-sharp silicon tip coated with a layer of material, the silicon is removed from the structure. The remaining material is utilized as a mold. Metal deposited in the mold replicates the original silicone tip. In this way, ultra-sharp all-metal tips suitable, for example, as field-emitter sources are provided.

6 Claims, 4 Drawing Sheets

MICROMINIATURE TAPERED ALL-METAL STRUCTURES

BACKGROUND OF THE INVENTION

This invention relates to microminiature tapered structures and, more particularly, to all-metal structures having ultra-sharp tips.

Microminiature tapered structures have been proposed for use in a variety of applications of practical importance. Thus, for example, such structures in the form of field-emitter cathode tips have been suggested for use in matrix display devices, in scanning electron microscopes and in traveling wave tubes. These tips can also be employed in scanning tunneling microscopes, in atomic force microscopes, as biological probes and as electrodes in a variety of solid state devices.

In a copending commonly assigned application, Ser. No. 551,771, filed July 12, 1990, there is described a technique for making a substantially uniform array of tapered silicon structures, each having a tip that exhibits a radius of curvature of 10 nanometers or less. Although silicon tips made by that technique are advantageous for use in many applications, there are other applications of the type mentioned earlier above in which all-metal tips having the same sharpness and uniformity would be preferred. Relative to silicon, such all-metal tips would provide enhanced mechanical strength, better electrical and thermal conductivity and a different chemical reactivity. It was recognized therefore that all-metal tips of this type, if available, would in many cases provide a basis for improved device performance.

SUMMARY OF THE INVENTION

In accordance with the principles of the present invention, an array of silicon tips is utilized in effect as a pattern definitive of a desired array of all-metal tips. The silicon tips are covered with a layer of silicon dioxide. The silicon is then removed, leaving a mold made of silicon dioxide. Subsequently, a layer of a suitable metal is deposited in the mold to replicate the original silicon tip array.

Alternately, the layer of silicon dioxide covering the silicon tips is replaced with a layer of silicon nitride or other suitable material. The silicon is then removed, leaving a mold made of silicon nitride or other material. Subsequently, a layer of a suitable metal is deposited in the mold to replicate the original silicon tip array.

BRIEF DESCRIPTION OF THE DRAWING

A complete understanding of the present invention and of the above and other features thereof will be apparent from a consideration of the detailed description below taken in conjunction with the accompanying drawing, not drawn to scale, in which.

DETAILED DESCRIPTION

Figure 1:
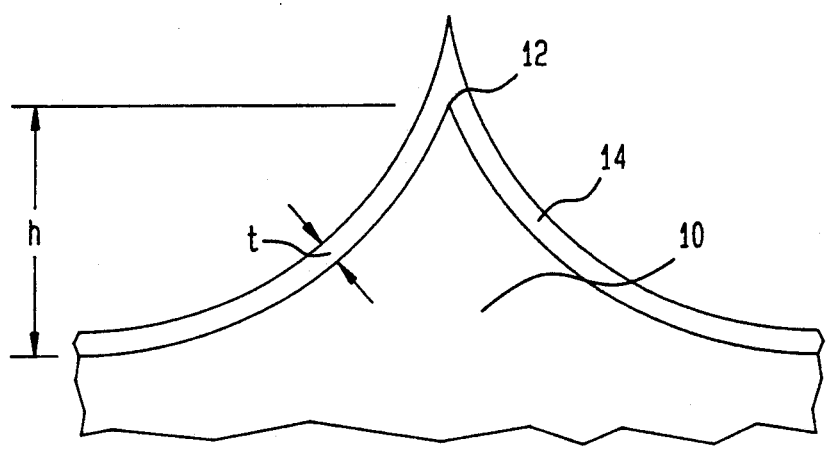
FIG. 1 is a cross-sectional depiction of a silicon tip of the type made in accordance with the technique described in the aforecited application.

In accordance with the method described in the aforecited application, tapered silicon structures are made using silicon processing technology. A tapered structure made by the described method has, at its tip, a radius of curvature of 10 nanometers or less. Arrays of such structures are specified in the application as being well suited, for example, as electron emitters in display devices.

More specifically, the aforecited application describes the initial formation of flat-topped protuberances on a silicon substrate. Illustratively, the protuberances are formed by standard silicon processing techniques such as isotropic etching (in, for example, a mixture of nitric and hydrofluoric acids), by reactive ion etching, or by ion milling. The resulting protuberances each comprise an essentially flat top portion and straight or concave sidewalls. In practice, the width of each flat portion preferably does not exceed about 500 nanometers.

In further accord with the method described in the aforecited application, the flat-topped protuberances are then in effect sharpened by an oxidizing heat treatment. Illustratively, the protuberances are exposed to a dry-oxygen environment, preferably at a temperature not exceeding 1050 degrees Celsius, and preferably with oxygen contributing at least 50 percent and water vapor at most 1 percent of total pressure. Typically, diluent or carrier gases such as helium, argon or nitrogen are used during the exposure. In the interest of an adequate reaction rate for processing times of 2 to 6 hours at ambient pressure, processing is carried out at a temperature of at least approximately 900 degrees Celsius. The use of higher or lower pressures is not precluded. Processing times are inversely related to pressure and temperature.

Subsequently, surface oxide is stripped from the oxidized structure described in the aforecited application. Such stripping is carried out, for example, in concentrated hydrofluoric acid or a buffered hydrofluoric solution. For enhanced sharpness and uniformity of the resulting silicon structure, oxidation processing and stripping may be repeated several times, the preferred number of repetitions being directly related to the original width of the flat-topped protuberances. Optionally, in case protuberances in an initial array are of highly nonuniform shape, processing as described above may be preceded by exposure to a humid environment at a temperature above about 1050 degrees Celsius for times longer than 3 minutes, resulting in more uniform morphology.

Tapered silicon structures made by the method described in the aforecited application include sharp and uniform arrays of needles, cones, pyramids, wedges and ridges. Each of these structures can be characterized by a radius of curvature at an apex of the taper. In the case of needles, cones and pyramids, such termination is approximately spherical, with a well-defined radius of curvature; in the case of wedges or ridges, straight or curvilinear, curvature is determined in a plane perpendicular to a wedge or ridge. In every such structure, there is at least one cross section in which radius of curvature is defined in this fashion.

In further accord with the invention described in the aforecited application, once a sharpened highly uniform array of silicon structures has been produced, it is possible, without loss of uniformity, to decrease apex sharpness by a further high-temperature oxidation treatment. Suitable for that purpose are wet or dry oxidizing environments, preferably at a temperature that exceeds 1050 degrees Celsius. For example, when sharpened protuberances having radii of curvature of 1 nanometer are exposed to water vapor at a temperature of 1100 degrees Celsius for 3 minutes, the radii of curvature increase uniformly to approximately 2.5 nanometers.

In accordance with the principles of the present invention, an oxidized silicon structure having a taper of the type specified above is utilized as a precursor of an all-metal tip. An illustrative such precursor, made by the method described in the aforecited application, is depicted in FIG. 1.

FIG. 1 shows a silicon protuberance 10 having an ultra-sharp apex or tip 12. In accordance with the present invention, the shape of the silicon precursor is designed to be as nearly identical as possible to the prescribed shape of the all-metal tip to be formed therefrom. Herein, for purposes of a specific illustrative example, the silicon protuberance 10 will be assumed to constitute a four-sided pyramid having concave sides and an apex 12 having a radius of curvature of approximately 1 nanometer. The height h of each such protuberance of an array of protuberances formed on a silicon substrate is, for example, about 2 micrometers.

FIG. 1 shows a layer 14 of silicon dioxide formed on the entire top surface of the silicon protuberance 10. Illustratively, the depicted layer 14 is so formed during the sharpening procedure described in the aforecited application. By way of example, the thickness t of the layer 14 formed during that procedure is only approximately 1500 Angstrom units. Since such a thickness is relatively fragile and would usually possess insufficient structural integrity by itself to serve as a mold in the inventive procedure described below, it is advantageous to thicken the layer 14. This is done by depositing additional silicon dioxide on the entire top surface of the layer 14. Illustratively, an additional thickness of about 2000 Angstrom units of silicon dioxide is deposited on the layer 14 in a standard chemical-vapor-deposition (CVD) step. The resulting structure is represented in FIG. 2, where layer 16 of silicon dioxide has a thickness of approximately 3500 Angstrom units.

Alternatively, in accordance with the principles of the present invention, a layer of silicon nitride or other material can be substituted for the silicon dioxide layer 14. More specifically, the layer 14 can, for example, be etched in hydrofluoric acid and replaced with deposited silicon nitride or other material. In that case, the mold layer 16 comprises silicon nitride or other material having a thickness of approximately 3500 Angstrom units. The choice of silicon nitride or another material in place of silicon dioxide is dictated, for example, by the desire to minimize or avoid attacking deposited metal with the etchant utilized subsequently to remove the mold layer.

For purposes of a specific illustrative example, the particular mold layer 16 described below will be assumed to be made of silicon dioxide. But it should be realized that in accordance with this invention other materials (such as silicon nitride) can be substituted therefor if, for example, the etchant used to remove silicon dioxide would be injurious to the deposited metal.

Figure 2:
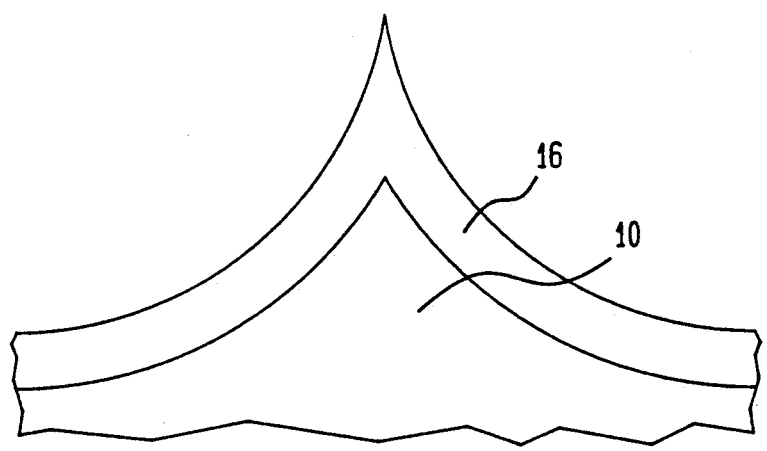
FIG. 2 shows a FIG. 1-type silicon tip having a relatively thick layer of silicon dioxide formed thereon.
Figure 3:
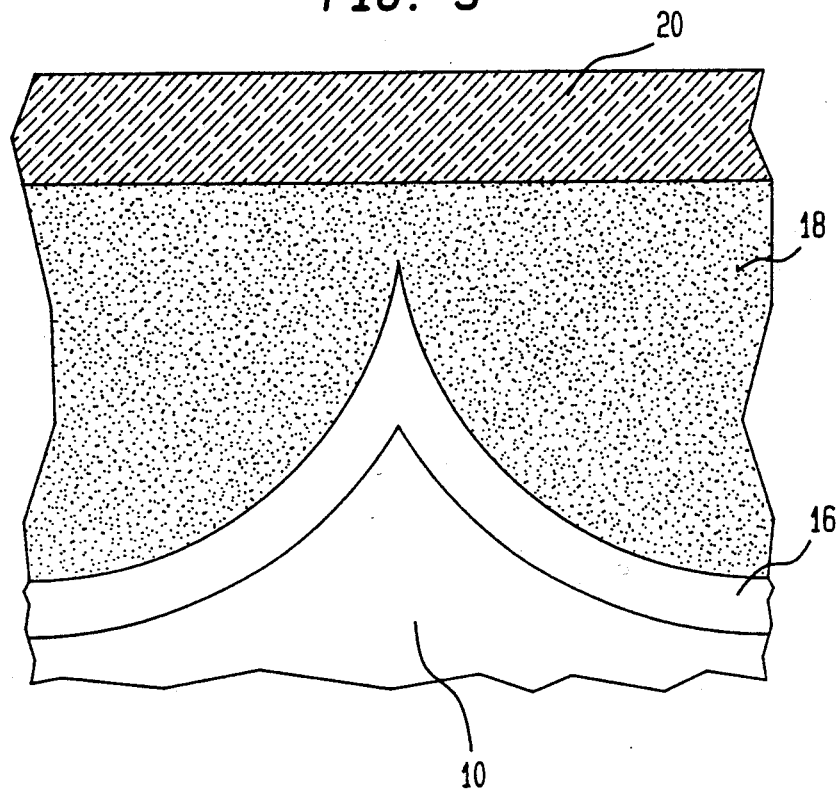
FIG. 3 represents the silicon tip of FIG. 2 with a support structure affixed to the top thereof.

Next, a top support assembly for the FIG. 2 structure is provided. Illustratively, as shown in FIG. 3, a suitable such assembly comprises a layer 18 that covers the entire top surface of the silicon dioxide layer 16 and has a thickness that exceeds the height of the depicted protuberance. The assembly also includes a rigid plate member 20. By way of example, the layer 18 comprises wax or an epoxy material, and the member 20 comprises a glass plate.

Subsequently, in accordance with the invention, the supported structure shown in FIG. 3 is then processed to remove the silicon therefrom. Advantageously, such removal is carried out in a series of steps. First, bottom portions of the silicon substrate represented in FIG. 3 are removed by, for example, conventional mechanical abrasion (lapping). Illustratively, all of the bottom silicon is thereby removed to within about 25 micrometers of the silicon-to-silicon dioxide interface in regions between adjacent protuberances. Then additional silicon is removed in a wet etching step in a standard mixture of hydrofluoric, nitric and acetic acids. Such a mixture etches silicon relatively fast while attacking silicon dioxide considerably more slowly. This wet etching step is carried out until, for example, the square-shaped bottom of the pyramidal protuberance 10 is visible. Remaining silicon including the apex of the protuberance 10 is then removed in an etching step that removes silicon while etching silicon dioxide relatively slowly. Numerous conventional etchants that exhibit this property are known in the silicon processing art. One illustrative such etchant comprises a standard potassium hydroxide solution. This solution etches silicon highly selectively relative to silicon dioxide, thereby leaving substantially intact the inside contour of the silicon dioxide layer 16 in the vicinity of the removed silicon apex.

Figure 4:
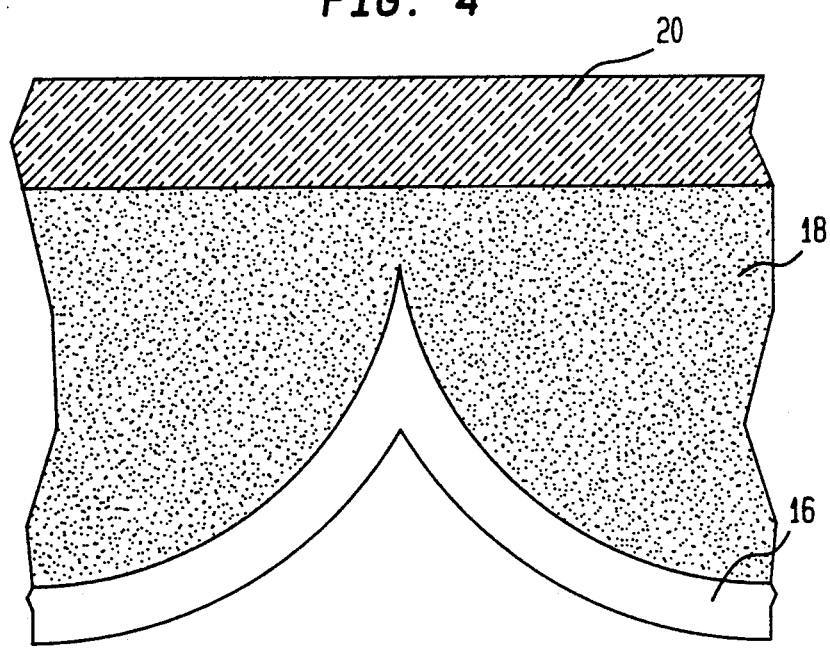
FIG. 4 illustrates the FIG. 3 arrangement with all the silicon removed therefrom.

At that point in the herein-described procedure, the structure appears as shown in FIG. 4. The supported layer 16 of silicon dioxide comprises a mold for subsequent deposition therein of a suitable metal. Importantly, the inside shape of the mold, in particular the apex region thereof, constitutes a substantially exact replica of the just-removed silicon protuberance 10.

Figure 5:
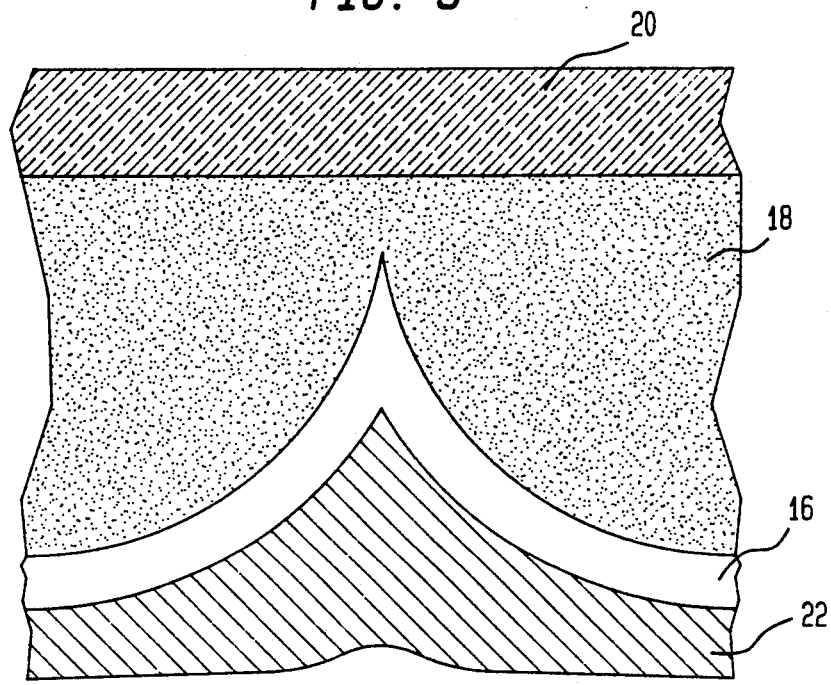
FIG. 5 depicts the FIG. 4 arrangement with a metal deposited on the underside thereof.

As indicated in FIG. 5, a layer 22 of a metal is then deposited in the aforedescribed mold made of silicon dioxide. Illustratively, the layer 22 is formed in a sputtering step, in a CVD step or by electroless deposition. Alternatively, if the layer 16 is doped sufficiently to render it conductive, the layer 22 can be formed by conventional electrodeposition techniques.

Advantageously, the layer 22 of FIG. 5 comprises a relatively low-work-function metal such as tungsten, molybdenum or aluminum. Such materials are well suited for forming ultra-sharp all-metal tips for use as field-emissive electron sources. Other metals or combinations of metals (for example, a deposited layer of titanium followed by a deposited layer of gold) are also suitable for casting all-metal tips. Still other metals that are characterized by relatively small grain size and that can be deposited from relatively low-temperature sources are believed to be suited for utilization in the herein-described method.

Figure 6:
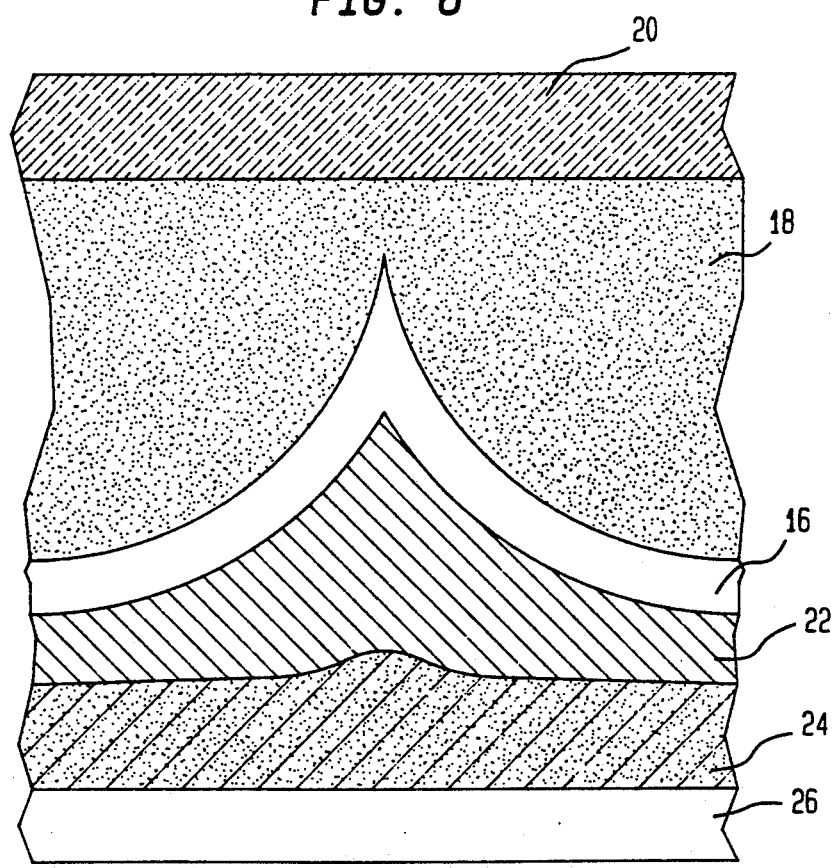
FIG. 6 shows the FIG. 5 arrangement with a support structure affixed to the bottom thereof.

Next, a bottom support assembly for the FIG. 5 structure is provided. Illustratively, as shown in FIG. 6, a suitable such assembly comprises a layer 24 in contact with the entire bottom surface of the layer 22 and a rigid plate member 26. By way of example, the layer 24 comprises a conductive material such as conductive epoxy or a suitable deposited metal such as nickel, and the member 26 comprises a conductive plate made, for example, of doped silicon. In such a case, the plate 26 provides mechanical support for and electrical contact to the depicted tip of the layer 22.

Alternatively, the metal cast into the herein-described silicon dioxide mold may be deposited sufficiently thick so that the cast metal itself serves as a support and electrode for the depicted structure. In that case, the additional layer 24 and plate 26 shown in FIG. 6 are not needed.

Figure 7:
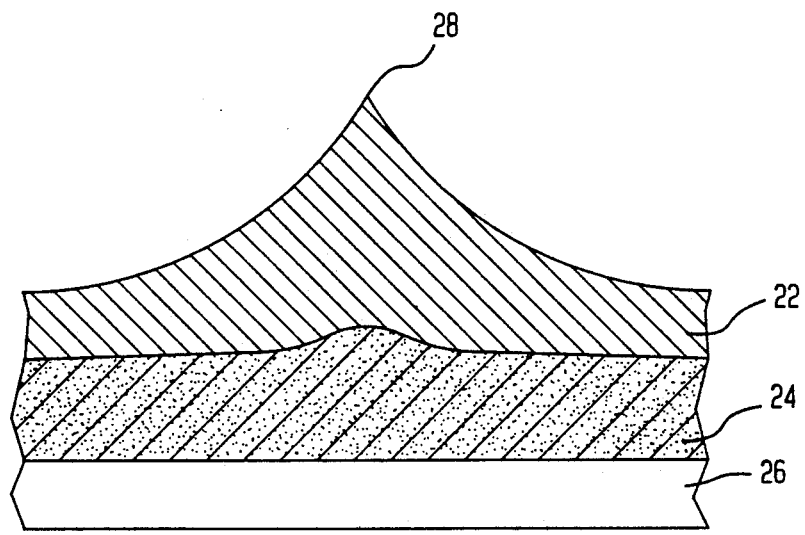
FIG. 7 shows the FIG. 6 arrangement after the top support structure and the layer of silicon dioxide have been removed from the top thereof.

The wax or other material that constitutes the layer 18 of the top support assembly shown in FIG. 6 is then removed. Subsequently, the silicon dioxide layer 16 overlying the layer 22 is removed in, for example, a wet etching step utilizing buffered hydrofluoric acid. In this wet etching step, the metal layer 22 is substantially unaffected. The resulting structure, comprising the layer 22 with an ultra-sharp tapered tip 28, is represented in FIG. 7. Illustratively, the radius of curvature of the apex of the tip 28 is approximately 1 nanometer.

Figure 8:
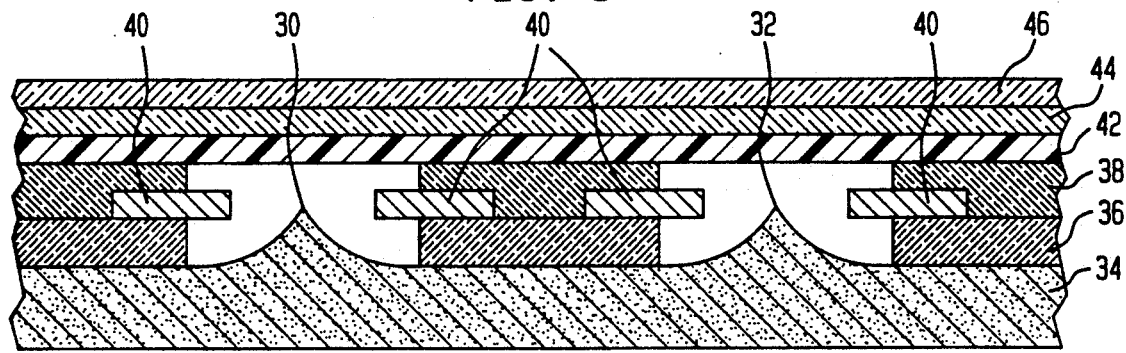
FIG. 8 is a schematic representation of a portion of an array of metal tips each of the type shown in FIG. 7.

FIG. 8 shows the general design of a portion of a specific illustrative display device comprising an array of all-metal ultra-sharp tips of the type described above. Two such tips, designated 30 and 32 in FIG. 8, comprise field-emission cathodes in the depicted device. These tips are mechanically supported by and electrically connected to substrate 34 (which, for example, comprises the layer 24 and the plate member 26 shown in FIG. 7, or comprises an integral substrate made of the same metal as that of the tips).

The illustrative device of FIG. 8 further includes dielectric layers 36 and 38 made, for example, of silicon dioxide, polyimide, or a combination of silicon dioxide and polyimide. Illustratively, each of the layers 36 and 38 is about 1.5 micrometers thick. Gate electrodes 40, each about 0.5 micrometers thick, are made, for example, of titanium, titanium-nickel, titanium-gold, or polycrystalline silicon.

Layer 42 of FIG. 8 is made of a suitable phosphor. Choice of phosphor material depends on the desired color. For example, zinc silicate doped with manganese produces green light when exposed to electrons emitted from the tips 30 and 32. A red display can be obtained by inclusion of europium-doped yttrium-phosphorus-vanadium oxide. These and other choices are well known in the art.

The device shown in FIG. 8 still further includes a transparent conductive anode layer 44 made, for example, of indium-tin oxide. Glass plate 46 constitutes the top-most layer of the depicted display device.

Tips of the type designated 30 and 32 in FIG. 8 may be arranged in one- or two-dimensional arrays. In display devices intended for direct viewing, cathodes comprising such tips typically have a height of 1-to-10 micrometers and are spaced 2-to-20 micrometers apart. Illustratively, the spacing between the tips and the phosphor layer 42 is in the range of 5-to-500 micrometers.

Localized phosphorescence is produced in the layer 42 of FIG. 8 by applying a suitable voltage between the substrate 34 and a gate electrode 40 while applying a constant voltage between the substrate 34 and the anode layer 44. Alternatively, the anode layer 44 may be patterned into a plurality of segments, and control voltages may be applied between the gate electrodes 40 and such segments, while the substrate 34 is held at a constant voltage.

Tapered all-metal tips of the type described herein are advantageous for use in a variety of practical devices. Heretofore, no practical way of easily achieving uniform arrays of such ultra-sharp tips has been available.

Finally, it is to be understood that the above-described specific techniques and arrangements are only illustrative of the application of the principles of the present invention. In accordance with these principles, numerous modifications and alternatives may be devised by those skilled in the art without departing from the spirit and scope of the invention.

What is claimed is:

1. A method of making a microminiature tapered all-metal structure, said method comprising the steps of:
    forming in a top surface of a silicon substrate a tapered silicon protuberance which terminates in an apex whose radius of curvature is less than 10 nanometers,
    covering the entire surface of said protuberance with a layer of material,
    removing the entirety of said silicon while leaving said layer of material substantially intact to serve as a mold whose contour is substantially identical to that of said tapered silicon protuberance,
    depositing a metal in said mold,
    and removing the layer of material from said deposited metal.

2. A method as in claim 1 wherein siad layer of material comprises silicon dioxide.

3. A method as in claim 1 wherein said layer of material comprises silicon nitride.

4. A method as in claim 1 wherein said metal is selected from the group consisting of tungsten, molybdenum and aluminum.

5. A method as in claim 4 wherein said layer of material is at least approximately 3500 Angstrom units thick.

6. A method as in claim 5 wherein the step of removing said silicon comprises
    initially mechanically abrading the bottom surface of said silicon substrate,
    etching the bottom surface of said abraded silicon substrate in a wet etching step in a mixture of hydrofluric, nitric and acetic acids,
    and then removing the remainder of said silicon in a wet etching step utilizing potassium hydroxide.

* * * * *